Sept. 21, 1965　　　C. E. LOUGHNEY, JR　　　3,207,552
CHILD'S SAFETY SEAT

Filed Dec. 7, 1962　　　3 Sheets-Sheet 1

INVENTOR.
CHARLES E. LOUGHNEY JR.
BY
ATTY'

Sept. 21, 1965 C. E. LOUGHNEY, JR 3,207,552
CHILD'S SAFETY SEAT
Filed Dec. 7, 1962 3 Sheets-Sheet 2

INVENTOR.
CHARLES E. LOUGHNEY JR.
BY Jord E. Smith
ATTY

Sept. 21, 1965  C. E. LOUGHNEY, JR  3,207,552
CHILD'S SAFETY SEAT
Filed Dec. 7, 1962  3 Sheets-Sheet 3
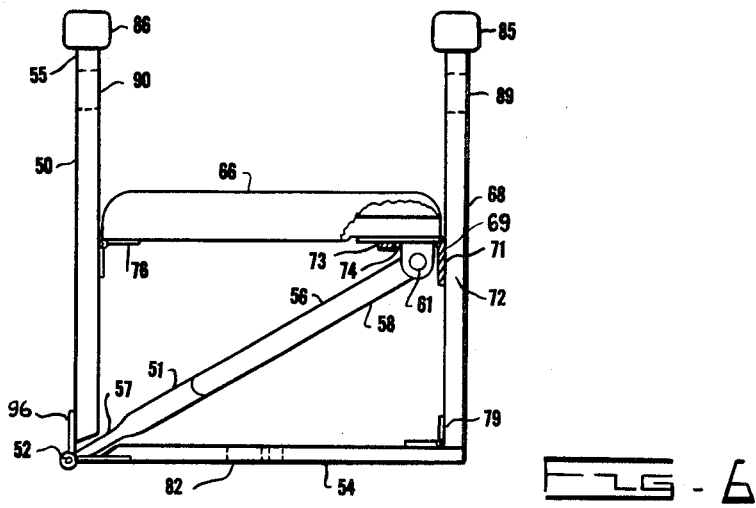
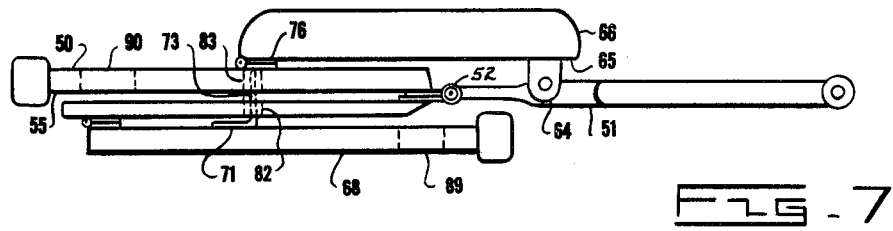
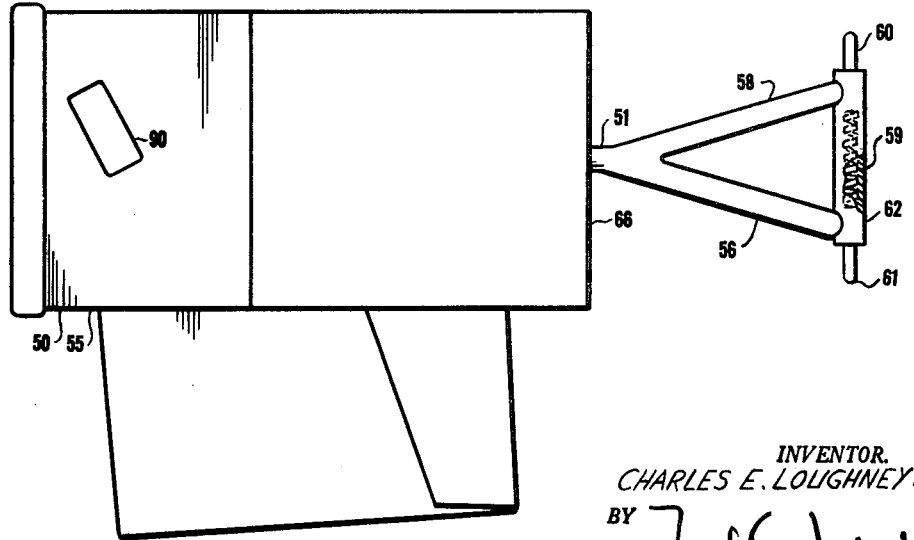
INVENTOR.
CHARLES E. LOUGHNEY JR.
BY
ATTY

United States Patent Office 3,207,552
Patented Sept. 21, 1965

3,207,552
CHILD'S SAFETY SEAT
Charles E. Loughney, Jr., 4225 83rd Ave. SE.,
Mercer Island, Wash.
Filed Dec. 7, 1962, Ser. No. 243,158
2 Claims. (Cl. 297—37)

This invention relates to a child's safety seat useful as an auxiliary or supplemental seating means in a vehicle.

The invention, briefly described, comprises a child's bench or seat cushion, upright supporting means positioning the seat cushion above a vehicle seat, a transverse floor held by the upright supporting means and receiving structure in the upright supporting means located above the seat cushion to receive an adult safety seat belt.

Among the important objects of this invention in providing a child's seat for vehicles are:

(1) reliably and comfortably supporting a child upon a conventional adult seat and against its usual back;

(2) holding the child's seat and the child safely in place by a standard adjustable adult seat belt;

(3) disposing the adult seat belt across the child's lap with low pressure and considerable comfort while adequately restraining the child;

(4) elevating the child to an eye level normal for adults yet holding the child from being pitched forward;

(5) covering the vehicle seat preventing scuffing and dirtying by the child's feet;

(6) simply folding an embodiment for convenient storage;

(7) designing the embodiments for simple and inexpensive construction;

(8) avoiding any modifications to conventional adult seats and seat belts; and (9) easily and quickly removing the child's seat to clear the adult seat.

These and other objects and advantages of the invention will become apparent from the following description read in connection with the drawings, in which:

FIGURE 6 is a front view of the foldable child's safety seat shown in FIGURE 4 with some portions broken away to illustrate other parts;

FIGURE 7 is a side view of the foldable child's safety seat of FIGURE 4 showing the seat components folded together; and FIGURE 8 is a top view of the foldable child's safety seat of FIGURE 4 showing the seat components folded together for storage.

Figure 1:
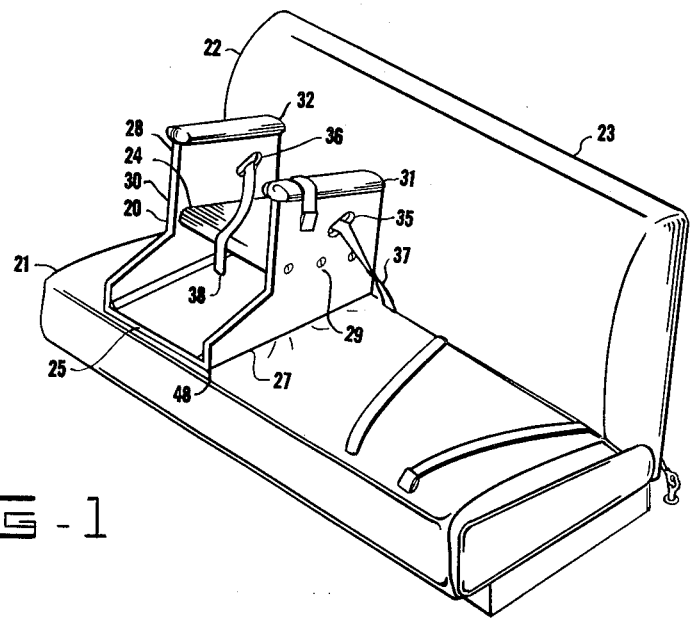
FIGURE 1 is a perspective view of an adult vehicle seat showing in addition an unoccupied child's safety seat located in a position where an adult normally would ride, the child's safety seat being ready for occupancy by a child.

Seating accommodations for children while riding in a vehicle have been provided previously, however, if the vehicle was accelerated or decelerated too severely, or was hit in an accident, children riding in the seats have in the past been potentially subject to severe injury. In contrast, this invention provides the child passenger with safe seating accommodations in any moving vehicle. Both the child and the child's parent or guardian are assured the child is provided with the best safety seating arrangement possible even considering the design of a child's seat at the outset as a permanent seat in each vehicle.

This child's safety seat temporarily converts an adult seat, without previous modification, into a child's seating accommodation providing the child with the same standard of safety made available to an adult who is safely belted into his seat. Furthermore, the child is provided with substantially the same comforts made available to the adult. Similarity of comfort is realized because the child's seat rests upon the adult seat cushion utilizing its cushioning effect and the rear of the child's seat is left unobstructed so the seated child will be able to rest his or her back directly against the adult back cushion benefitting from its cushioning effect.

The adult seat belt available in any seating location through out a vehicle is used without modification, except as to possible minor on-the-spot belt length adjustments like those normally made in accommodating adult passengers of varying sizes. Once in position, the child's safety seat is preferably belted down even though unoccupied, to become an integral part of the seat. When a child is carried in the safety seat, the adult seat belt passes over the lap of the child in the same manner as the belt fits over the lap of an adult. By select placement of the belt accesses in the child safety seat, the child, while riding under normal circumstances, is controllably positioned but not entirely subjected to the full tensional force in the belt. In the event of a rapid deceleration, however, the belt will hold the child firmly to the child's seat, the child's seat firmly to the adult's seat, and the adult seat firmly to the vehicle structure, assuring the child will remain in his or her seating position avoiding injuries which might otherwise result if the child were thrown against hard structure of the vehicle or thrown free of the vehicle.

The provision of this child's safety seating accommodation within a vehicle is done in a way benefiting the child as a participating passenger during any journey. The child is elevated to a position where he or she can view the scenery as an adult does, making the trip more enjoyable.

As noted previously, the child travels in this viewing position with substantially the same comfort as an adult enjoys and this is assured by padding the child's safety seat.

As an indirect but important benefit, when a child is able to travel in this safety seat, the driver of the car will not be distracted from his important job of looking ahead because he must care for the child, thereby avoiding any potential accident from this cause. In traffic today, the driver of any vehicle will perform much better knowing his or her passengers, whether young or old, are protected from injuries caused by quick stopping.

When children will be transported only occasionally, a foldable structure for a child's safety seat may be of value. The child's safety seat may then be removed for storage in a vehicle luggage compartment and the adult seat capacity will be regained. If this be the desire, then the foldable structure is preferably arranged for operation in a geometric plane not in the plane of the vehicles primary motion. By following this design specification, a foldable child's safety seat will not collapse under severe acceleration or deceleration forces.

Child's safety seats meeting these purposes and objects are illustrated in the accompanying drawings. In FIGURE 1 a perspective view is shown of the child's safety seat 20 positioned on a seat cushion 21 and against a back cushion 22 of an adult seat 23 as used in a vehicle (not shown). A foldable child's safety seat would also be used in a like manner.

Figures 2, 3:
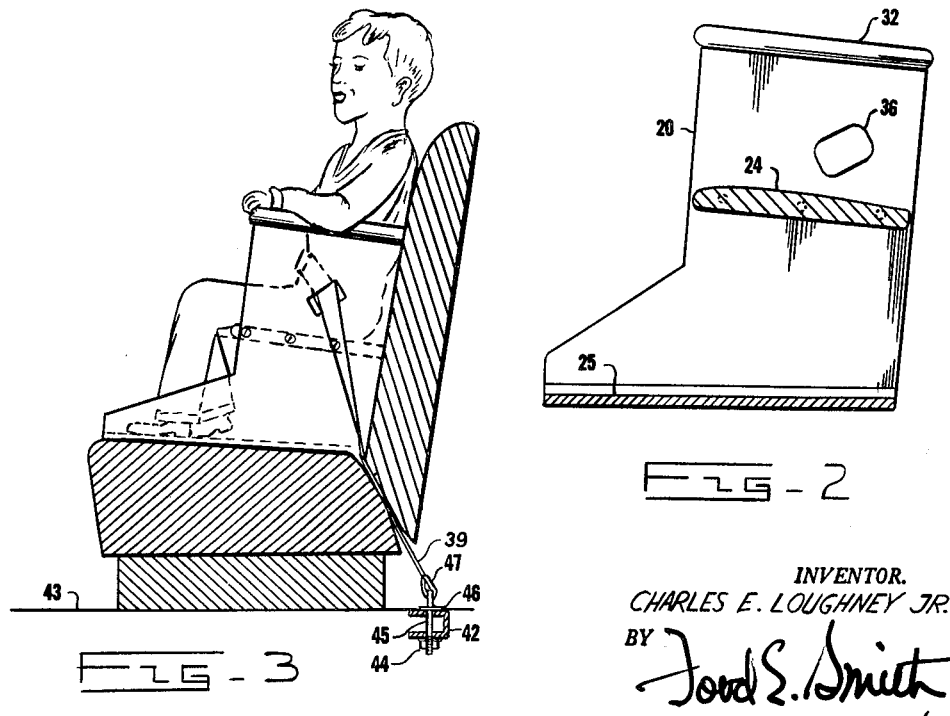
FIGURE 2 is a vertical section view of the child's safety seat of FIGURE 1 showing the arrangement of the child's seat, the side support of the child's seat, the safety belt access in the side support and the structural floor to receive the child's feet.
FIGURE 3 is a side elevation showing a child seated in the child's safety seat of FIGURE 1 and located in position on the vehicle adult seat with the safety belt installed to secure both the child's safety seat and the child to the vehicle structure.
Figure 4:
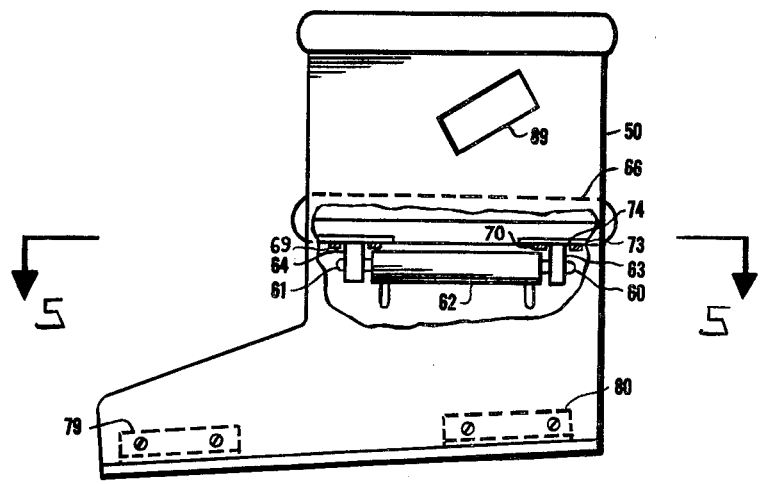
FIGURE 4 is a side elevation of a second embodiment of the child's safety seat broken away to illustrate parts added and changed making the seat foldable for storage between times of utilization.
Figure 5:
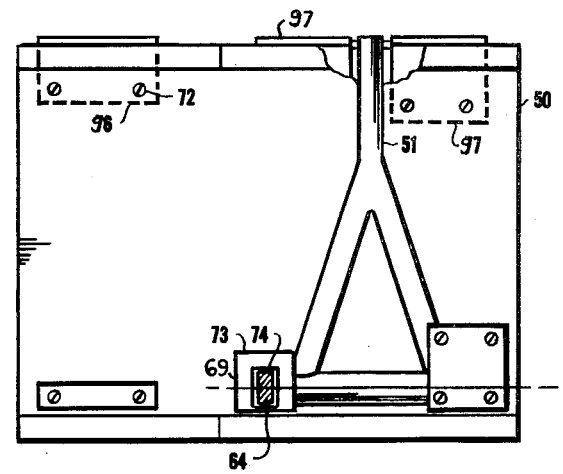
FIGURE 5 is a section view of the child's safety seat of FIGURE 4 taken along section line 5—5 shown in FIGURE 4.

As indicated in FIGURES 1, 2 and 3, the child's safety seat 20 provides a new seat cushion 24 for the child to sit on elevated above the adult seat cushion 21 holding the child so his or here eye level approaches that of an adult passenger, allowing the child to see out of the vehicle windows. Furthermore, the child's back rests against the back 22 of the adult seat cushion. Also the child's feet rest below him on a floor 25, serving the dual purpose of a lateral spacing structural member 25 of the child's safety seat. The side portions or panels 27, 28 of the child's safety seat extend from the floor 25 up part way to 29, 30 to hold the child's seat cushion 24 and beyond 31, 32, where they are padded, to support the child's arms. Through slanted openings 35, 36 in these side panels 27, 28, safety belts 37, 38 of standard adult configuration are passed slanted at an angle across the child in a comfortable position. One end 39, 40 (one end not shown), respectively, of each adult belt 37, 38, respectively, is securely fastened to structural member 42 of the vehicle (not shown) which may be associated with the vehicle floor 43 or be independent thereof. Any suitable fastening means may be provided but preferably a threaded anchoring member 45 is fastened to the vehicle structural member 42 by a nut 44 and its eyelet top 46 projects above the vehicle floor 43 a short distance to receive seat belt fittings 47.

The structural floor 25 and the side panels 27, 28 of the child's safety seat project forwardly, extending entirely across the depth of the adult seat 23 to provide the floor 25 and to establish a potential pivoting point 48 of the child's safety seat near the leading edge of the adult seat cushion 21. With the child's safety seat pivotal point being located in this position and with the force direction of the seat belt being substantially removed from it, the resulting force moment resisting any overturning force moment is quite substantial. The child, when properly fastened in the seat, will remain in place even though the overturning force moment might be quite substantial occurring as a vehicle hit a stationary or slowly moving object or vehicle.

In addition to all the structural features noted in regard to this first embodiment the second embodiment illustrated in FIGURES 4, 5, 6, 7 and 8 is provided with structural features making it possible to fold the child's safety seat components together for storage purposes.

The essential locking and supporting part of this foldable child's safety seat 50 is the diagonal brace 51 hinged on a hinge axis 52 structurally common to hinges 96 and 97 of the floor 54, side panel 55 and the brace 51 itself. Opposite its hinge end 57, the diagonal brace 51 expands at its raised end 58 into a yoke 56 to accommodate spring 59 loaded locking pins 60, 61 confined within a cylindrical housing 62. The pins 60, 61 engage spaced recessed projections 63, 64 attached to the bottom 65 of the child's seat cushion structure 66 on the child's seat side 68 opposite the side 55 joined to the common hinge axis 52.

When the diagonal brace 51 is pinned into position with the seat cushion structures 66, both the brace 51 and the seat cushion structure 66 are additionally positioned by a pair of like structural angles 69, 70. Each angle has one leg 71 secured to the panel side 68 by screws 72 to position the other leg 73 for both holding the seat cushion structure 66 level and receiving the recessed projections 63, 64 through positioning slots 74 in the angle leg 73.

The child's seat cushion structure 66 is pivotally attached to the child's seat side 55 by like hinges 76, 77 held in place by screw fasteners 72. By a like manner, the child's seat side or panel 68 is pivotally attached to the floor 54 by like hinges 79, 80.

Upon folding in the manner indicated by FIGURES 7 and 8, the angle legs 73 pass through both slots 82 in the floor 54 and slots 83 in the side panel 55.

Also, upon folding, the padded arm rests 85, 86 and child's seat cushion structure 66 are on the outside so the child's safety seat may be laid and stored upon upholstery and other comparatively delicate surface materials without causing damage.

When unfolded with the diagonal brace 51 pinned in place, this foldable embodiment of the child's safety seat is secured in place in a vehicle in like manner with reference to the non-foldable embodiment. From the anchoring member 45, the adult seat belt is threaded between the seat and back cushions of the adult seat in like manner as it is threaded for adult use. Thereafter, the seat belt, either the left or right section, is inserted through slanted openings 89, 90 in the panel sides 55, 68 and fastened holding the child's safety seat 50 and, when occupied, the child is in a safe and comfortable viewing position eliminating the possibility of injury caused by hitting hard structures of the vehicle or by being thrown out of the vehicle.

This successful result is assured by this construction of the child's safety seat and its adult seat belt positioning on the adult seat resulting in the child's safety seat being a positively held structural component of the vehicle.

I claim:

1. A child's seat for safety confining and supporting a child in a vehicle locating the child adjacent the back cushion and above the seat cushion of an adult seat, comprising:
   (a) a transverse child seating structure positioned above the adult seat cushion so the occupying child may see through the vehicle windows;
   (b) upright sides supporting the transverse child seating structure above the adult seat cushion and interconnected with the child seating structure by both hinges on one upright side and projecting structure on another upright side;
   (c) a transverse floor pivotally joined to the lower portions of the upright sides;
   (d) a diagonal brace pivotally connected to the bottom of one upright side and releasably connected to the bottom of the transverse child seating structure adjacent to the other upright side; and
   (e) adult safety seat belt structure on the upright sides at a location above the transverse child seating structure to receive and to position adult seat belt sections for fastening together to hold in place as a unit within the vehicle, the child, the child's safety seat and the adult seat.

2. The child's seat, as claimed in claim 1, comprising padding secured to the transverse child seating structure and also to the top of the upright sides presenting with the upholstered back of the adult seat a completely padded environment for the seated child and also arranging top, bottom and end padding at the exterior of the folded child's seat thereby avoiding damage to the vehicle upholstery when the folded child's seat is carried on the upholstered vehicle seats.

References Cited by the Examiner

UNITED STATES PATENTS

| | | | |
|---|---|---|---|
| 1,498,041 | 6/24 | Keil | 297—42 |
| 2,450,301 | 9/48 | Quiggle | 297—44 |
| 2,642,923 | 6/53 | Roeder | 297—253 |
| 2,710,649 | 6/55 | Griswold | 297—389 |
| 2,777,502 | 1/57 | Travis | 297—250 |
| 2,947,353 | 8/60 | Von Wimmersperg | 297—254 |
| 2,954,070 | 9/60 | Moeller | 297—250 |

FOREIGN PATENTS 807,904   10/36   France.

FRANK B. SHERRY, *Primary Examiner.*